United States Patent
Tsukagoshi

Patent Number: 5,282,874
Date of Patent: Feb. 1, 1994

[54] CULTIVATION VESSEL AND CULTIVATION METHOD OF EDIBLE FUNGI

[76] Inventor: Nobuyuki Tsukagoshi, O-aza Yamazaki 331, Okabemachi, Osato-gun, Saitama, Japan

[21] Appl. No.: 167,529

[22] Filed: Mar. 14, 1988

[51] Int. Cl.[5] .............................................. A01G 1/04
[52] U.S. Cl. ........................................ 47/1.1; 220/366; 215/307
[58] Field of Search ................ 47/1.1, 1.104, 1.105; 435/243, 254, 296; 422/102; 215/307; 220/366, 367

[56] References Cited

U.S. PATENT DOCUMENTS

| | | | |
|---|---|---|---|
| 1,938,341 | 12/1933 | Lambert | 47/37 |
| 3,242,614 | 3/1966 | Thompson | 47/1.1 |
| 4,161,083 | 7/1979 | Fuzisawa et al. | 47/1.1 |
| 4,392,055 | 7/1983 | Whitney | 215/307 |

Primary Examiner—Gary Benzion
Attorney, Agent, or Firm—Bruce I. Adams; Van C. Wilks

[57] ABSTRACT

A cultivation vessel for fungi has a wide-mouthed upper opening and a lower opening, each of which is detachably covered by a respective top and bottom end cap. One or more such vessels are prepared, sawdust and rice barn are packed as the culture medium therein, and a mushroom spawn is inoculated thereon to spread and culture the hypha. After culturing for about 20 days, the culture mediums are taken out and further successively cultured for about 3 to 30 days in contact with each other to develop the fruit bodies.

7 Claims, 3 Drawing Sheets

CULTIVATION VESSEL AND CULTIVATION METHOD OF EDIBLE FUNGI

BACKGROUND OF THE INVENTION

The present invention relates to improvements in cultivation vessels for edible fungi, and more particularly, to improvements in vessels for culturing a mushroom spawn prior to germination after inoculation of the spawn. Furthermore, the present invention relates to a method of cultivating an edible fungus using artificial culture mediums prepared by such vessels.

The conventional artificial cultivation of edible fungi such as *Lyophyllum aggregatum, Flammulina velutiges,* and *Cortinellus shiitake* has been conducted according to three roughly divided steps. The 1st step comprises a preliminary step of mixing rice bran and sawdust which are the culture medium, packing them in a bottle, and sterilizing it. The 2nd step comprises a first culture step of inoculating a mushroom spawn on the sterilized culture medium to propagate the hypha, and the 3rd step comprises a second culture step of germinating the above cultured hypha to grow fruit bodies. All these steps have been conducted in a culture vessel having a wide-mouthed bottle shape.

When these steps are conducted in the wide-mouthed bottle, the developed *Lyophyllum aggregatum* and *Flammulina velutiges* come to grow out from the open part of the bottle, and in this case, there is a fixed limit in widening the said open part, resulting in a limitation on the number and size of the developed fruit bodies. This point, particularly, is not suitable to cultivation of fungi whose root parts are grown separately one by one as *Cortinellus shiitake*.

It has also been know heretofore to develop fruit bodies from the whole culture medium in the 2nd culture step described above by conducting steps to the said 1st culture step, or by inoculating the mushroom spawn on the culture medium to propagate the hypha, for example, in a vinyl bag having vents, and tearing this bag before germination to take out the culture medium. However, large-scale mechanical equipment is required to pack the culture medium in a vinyl bag, and the culture medium packed in this vinyl bag is inconvenient to handle and difficult to set. This is because during the 1st culture step, the manual work of packing the culture medium in the vinyl bag, sterilizing the same, and then opening the bag for inoculation tends to allow various germs to enter, furthermore there is no other means of tearing the vinyl bag but to do so by hand, which takes considerable time. In addition the torn vinyl bag can not be reused, so that this method had a disadvantage of increasing the cost of the resulting products.

As artificial cultivation generally comprises packing a culture medium in which sawdust and rice bran are mainly mixed in a bag or bottle, culturing it, and then developing fruit bodies, this method can be easily mechanized. The fungus bed is smaller than the material wood and the work required is not substantial. It is thus possible to achieve a good harvest from a small area. In addition, year-round cultivation is possible by utilizing air conditioning equipment.

The artificial cultivation has a short culture period compared with the material wood and also has a high yield. On the other hand, the equipment investment attendant upon mechanization the investment including air conditioning equipment becomes high.

Moreover, as artificial cultivation is essentially collective and uses a lot of energy, it is known to be unprofitable. This is particularly true during the period of increasing natural fungi and during periods of high energy consumption for cooling or heating.

Also, there have been problems of low yield and poor quality in the cultivation bottles, and of poor work efficiency in the bag cultivation.

SUMMARY OF THE INVENTION

In order to solve the foregoing problems, a cultivation vessel for fungi according to the present invention, comprises a vessel body having a wide mouth and an opened bottom part for introducing a culture medium on which a mushroom spawn is inoculated to spread and culture the hypha. The vessel also has a detachable bottom material capable of setting on said vessel body.

Also, in the cultivation method of fungi according to the present invention, a cultivation method is characterized by packing a top culture medium in which sawdust and rice bran are mixed in at least two vessels having detachable bottoms and sterilizing them; inoculating a mushroom spawn on the top said sterilized culture mediums; removing the bottoms of each vessel to take out the culture mediums after the fungus has spread and propagated on the culture mediums; and continuing the culturing by contacting the culture mediums with each other.

The culture medium may be automatically removed by pushing the same downwardly through the wide vessel mouth.

DETAILED DESCRIPTION OF PREFERRED EMBODIMENTS

A preferred embodiment of the present invention is illustrated based on the drawings.

Figure 1:
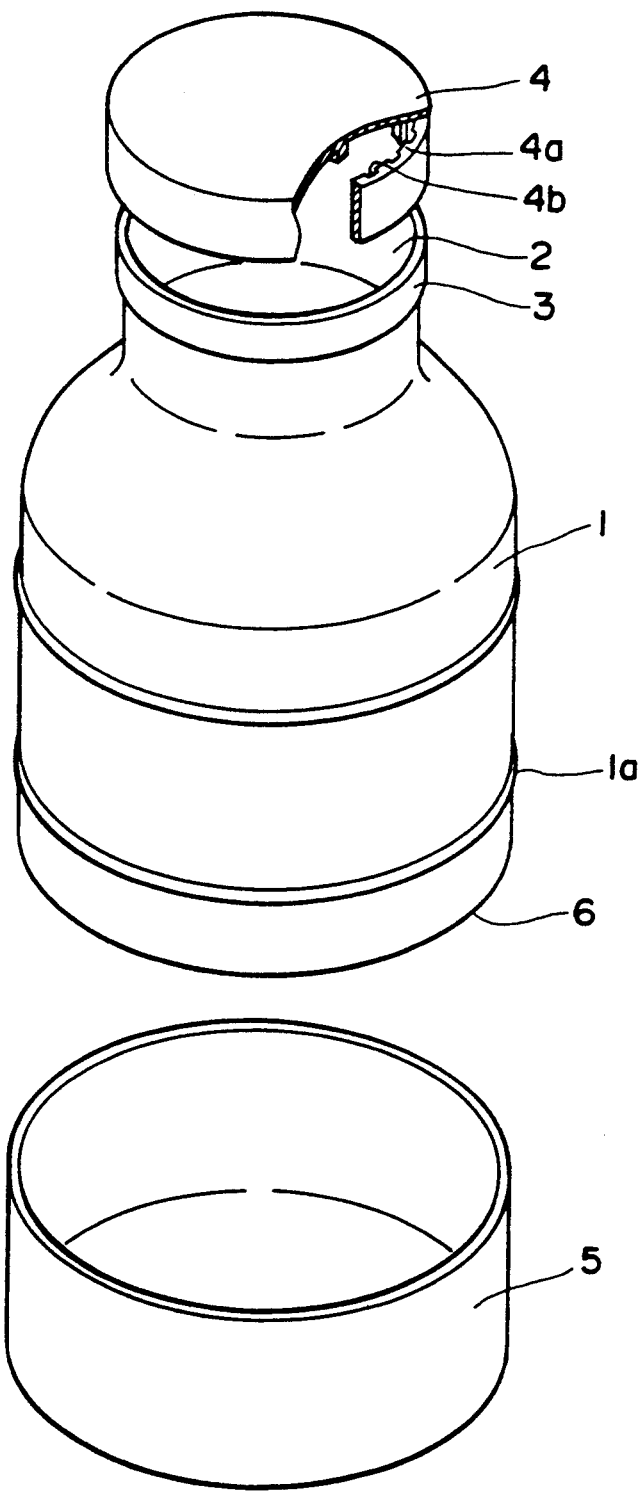
FIG. 1 is a perspective view illustrating the whole cultivation vessel for fungi according to the present invention.
Figure 2:
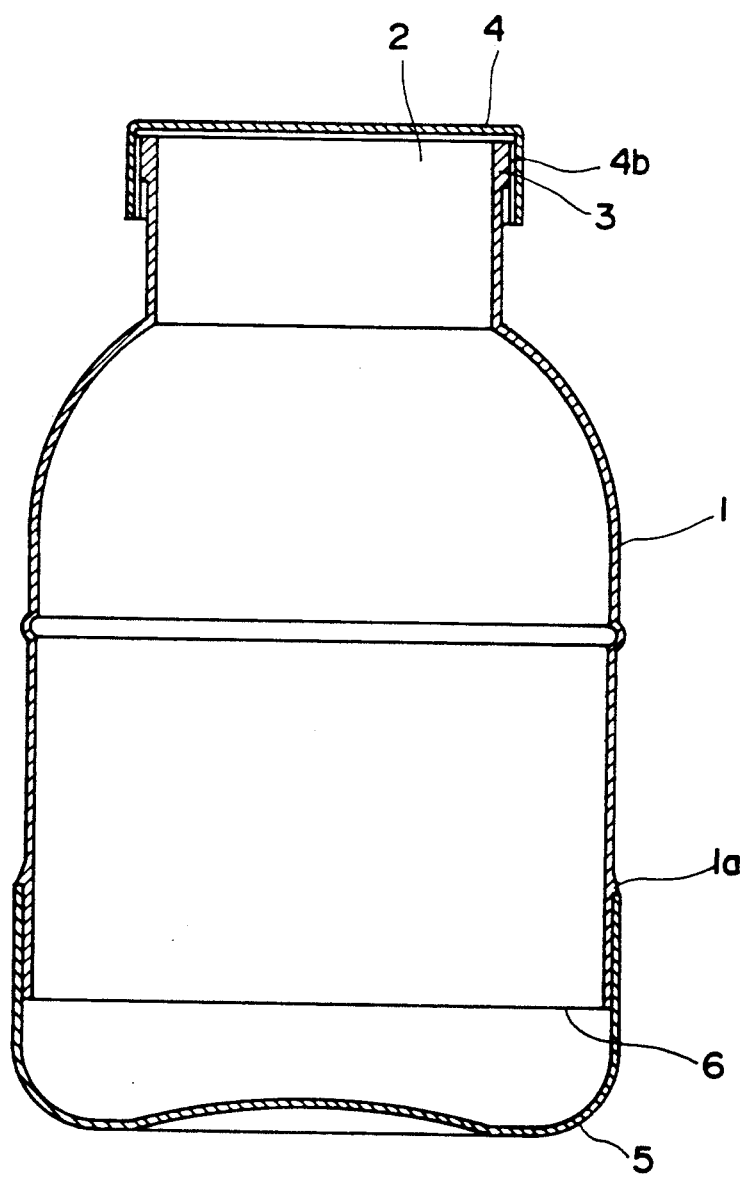
FIG. 2 is a longitudinal cross sectional view of the vessel of FIG. 1.

FIGS. 1 and 2 are a perspective view and a cross sectional view respectively illustrating one embodiment of the cultivation vessel of fungi according to the present invention. Reference numeral 1 is a vessel body made of a synthetic resin, which has a wide-mouthed opening 2 at the top. The bottom of the vessel body 1 is also open. A peripheral flange 3 is formed around the upper opening 2 and can be set in a cap 4.

The inner circumference of the cap 4 is formed with one or more substantially parallel axial channels 4b which establish axial ribs 4a therebetween. The cap 4 has a spacer element 4c on its undersurface which rests on the rim of the flange 3 when the cap is installed on the vessel, accordingly when the cap 4 is set on the vessel body, the channel 4b extends between the cap 4 and the flange around the opening 2 of the vessel body 1.

Reference numeral 5 represents a cup-like bottom of the cultivation vessel, whose inner diameter is made to be almost the same as or slightly larger than the outer diameter of the lower open part 6 of the vessel body 1 so that the bottom 5 can be detachable set on the vessel body 1. Since both the vessel body 1 and the bottom 5 are made from slightly elastic materials, they are not easily separated even if no particular catching means is provided. When the vessel body 1 is set in the bottom 5, said bottom 5 is stopped at a fixed position, established by the step part 1a provided on the outer circumference of the vessel body 1 which acts as a stopper. Accordingly, a fixed volume for the cultivation vessel can be maintained.

The cultivation method of the present embodiment is hereinafter described together with its effect. First, a culture medium in which sawdust and rice bran are mixed is packed in the vessel of the present embodiment (having the bottom set thereon) and sterilized in a known sterilization pot (the preliminary step).

Successively, a mushroom spawn is inoculated on the sterilized culture medium to propagate the hypha (the 1st culture step). This step is conducted in a culture room as the culture medium remains in the vessel for about 20 to 25 days under a fixed temperature and humidity. When the vessel of the present embodiment is capped, the gap 4b provided between the cap and the flange 3 around the upper opening 2 of the vessel body permits with gas to be released from the vessel to the open air and without reducing the humidity.

After the fungus is completely spread, the cap 4 of the vessel is removed and the bottom 5 is detached at the same time, the culture medium is pushed out from the upper opening 2 of the vessel using a puller (not shown in the drawing) and taken out from the vessel body 1. This work can be done by assembly-line operation using machines. Accordingly, as the subsequent 2nd culture step is conducted using the culture medium after removal from the vessel in the culture room where the temperature and humidity are controlled, germination and development to fruit body from the whole culture medium are possible and a higher yield can be expected, compared with the case when all the steps are conducted in the culture vessel.

After completion of the 2nd culture step, the once used vessel body 1 can be reused by reinstalling the bottom 5 thereon.

An embodiment of the cultivation method according to the present invention is illustrated below in further detail.

Using an edible fungus *Pleurotus ostreatus*, a culture medium 7 (FIG. 3) is prepared in the same manner as described in the illustration of the using method of the vessel. The vessel was made using 1,000 ml polypropylene.

Figure 3:
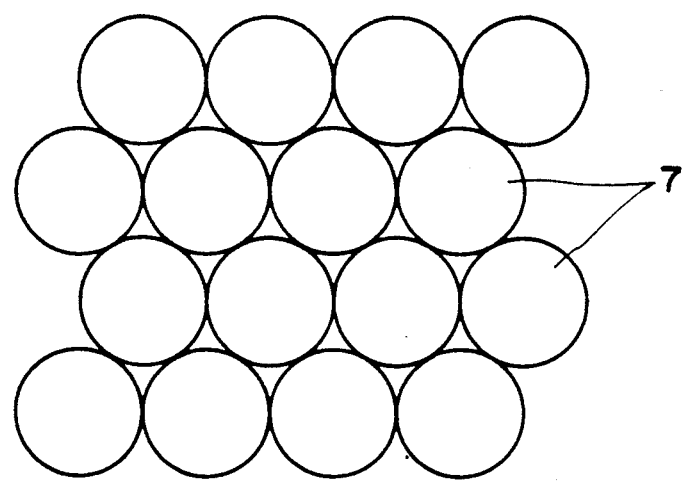
FIG. 3 is a schematic illustration of the contacting condition of the culture mediums removed from the vessels in the fungi cultivation method according to the present invention.

The spawn was cultured for 20 days, and after the hypha was completely spread, the culture medium 7 is pulled out from the vessel and 218 pieces were arranged in contact each other. The arranging method is shown in FIG. 3. After such contracting, the mediums are cultured for 3 days to develop the fruit body. The result is shown in Table 1.

TABLE 1

|  | Fruit body yield per piece (g) | Days till completion of fruit body harvest (day) |
|---|---|---|
| Contacted medium | 158.5 | 22 |
| Control (Cultured | 90.5 | 15 |

TABLE 1-continued

|  | Fruit body yield per piece (g) | Days till completion of fruit body harvest (day) |
|---|---|---|
| for 23 days) | | |

As shown above, the yield per place of culture mediums was highly increased, though the period of harvesting fruit bodies becomes slightly longer compared with the control or the conventional method.

Also high quality was obtained and no deformed fruit bodies nor scattering in each culture medium were observed.

As another embodiment, using an edible fungus *Cortinellus shiitake*, a culture medium was prepared in the same manner as the case of *Pleurotus ostreatus*. The vessel was made using 1,000 ml polypropylene.

The spawn was cultured for 65 days and when the culturing was almost completed, the culture medium was pulled out from the vessel, and 218 pieces were arranged in contact each other. The arranging method is shown in FIG. 3.

After the taking out, the culturing was continued for 30 days to develop the fruit bodies. The result is shown in Table 2.

However, as the *Cortinellus shiitake* is not satisfactorily grown as it remains in the vessel, the control was also pulled out and developed independently.

TABLE 2

|  | Fruit body yield per piece (g) | Days till completion of fruit body harvest (day) |
|---|---|---|
| Contacted medium | 255.3 | 140 |
| Control | 154.2 | 142 |

As shown above, a highly increased yield was achieved within the same days compared with the control.

The deformation caused by contacting the fruit bodies each other which is often observed in the control was reduced.

As to quality, thick fruit bodies could be obtained compared with the control and no degradation was seen even after 5 or 6 crop.

Besides this, *Pholita nameko, Pleurotus cystidiosus,* and *Grifola frondosa* afforded the same results.

In the cultivation vessel of fungi according to the present invention, the culture medium can be taken out by assembly-line operation using machines for separating the bottom from the vessel. A high yield can be achieved as germination and development to fruit body are possible in the subsequent cultivation, and further, the product cost can be reduced as the said cultivation vessel can be used repeatedly.

Contacting the plural culture mediums each other as the method of the present invention had an effect to improve the fruit bodies qualitatively as well as increase the fruit body yield per unit weight of the culture medium.

Although the cultivation methods and equipments conventionally vary depending on the kind of fungi, the present method enables the cultivation using the same equipment in regardless of the kind of the fungi.

The present invention can be utilized by conventional equipment without significant arrangement.

I claim:

1. A cultivation vessel for fungi, comprising: a vessel body having top and bottom open ends each terminating in a peripheral rim, the open bottom end adapted to receive a culture medium on which a mushroom spawn is inoculated to spread and culture the hypha, top and bottom caps detachably connectable to the respective top and bottom open ends to cover the same, each of said caps having means for spacing the inner cover surface thereof from the peripheral rim of its corresponding open end of the vessel.

2. A cultivation vessel for fungi according to claim 1, in which said top cap for said vessel body is further provided with an open air ventilation means.

3. A cultivation vessel for fungi according to claim 1, in which the inner diameter of said bottom cap for said vessel body is slightly larger than the outer diameter of the vessel body at the open bottom thereof.

4. A cultivation vessel for fungi according to claim 1, in which said vessel body has a flange formed around the outer circumference thereof, and said spacing means for said bottom cap comprises a peripheral sidewall of said bottom cap, said sidewall terminating at its upper end in a rim for abutting said flange to thereby space the inner cover surface of said bottom cap from the rim of the opening at the bottom of said vessel body.

5. The cultivation vessel of claim 1, in which said spacing means for said top cap comprises a spacer element protruding inwardly from the inner cover surface thereof and abutting the rim of the opening at the top of said vessel.

6. The cultivation vessel of claim 2, in which said top cap comprises a peripheral sidewall, and said ventilation means comprises at least one axially extending groove formed across the inner surface of said sidewall.

7. The cultivation vessel of claim 6, in which said sidewall is provided with a plurality of said axially extending grooves formed around the inner periphery of said sidewall.

* * * * *